United States Patent
Qu et al.

(10) Patent No.: US 11,546,081 B2
(45) Date of Patent: Jan. 3, 2023

(54) METHOD AND APPARATUS FOR CONFIGURING UPLINK TIME-FREQUENCY RESOURCE SET, AND METHOD AND APPARATUS FOR RECEIVING UPLINK TIME-FREQUENCY RESOURCE SET

(71) Applicant: BEIJING UNISOC COMMUNICATIONS TECHNOLOGY CO., LTD., Beijing (CN)

(72) Inventors: Xin Qu, Shanghai (CN); Su Huang, Shanghai (CN); Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 57 days.

(21) Appl. No.: 16/975,689

(22) PCT Filed: Apr. 2, 2019

(86) PCT No.: PCT/CN2019/080907
§ 371 (c)(1),
(2) Date: Aug. 25, 2020

(87) PCT Pub. No.: WO2019/192443
PCT Pub. Date: Oct. 10, 2019

(65) Prior Publication Data
US 2021/0385004 A1     Dec. 9, 2021

(30) Foreign Application Priority Data

Apr. 4, 2018 (CN) .......................... 201810304944.6

(51) Int. Cl.
*H04L 1/00* (2006.01)
*H04L 1/16* (2006.01)
(Continued)

(52) U.S. Cl.
CPC .......... *H04L 1/0013* (2013.01); *H04L 1/1614* (2013.01); *H04L 5/0048* (2013.01); *H04L 41/0803* (2013.01)

(58) Field of Classification Search
CPC ... H04L 1/0013; H04L 1/1614; H04L 5/0048; H04L 41/0803; H04L 1/00; H04L 5/00;
(Continued)

(56) References Cited

U.S. PATENT DOCUMENTS

2011/0237270 A1   9/2011  Noh et al.
2014/0369293 A1   12/2014 Guo et al.
(Continued)

FOREIGN PATENT DOCUMENTS

CN   102239649 A   11/2011
CN   103220802 A   7/2013
(Continued)

OTHER PUBLICATIONS

"eMBB and URLLC dynamic multiplexing and preemption indication on the uplink" 3GPP TSG-RAN WG1 #92, Feb. 26-Mar. 2, 2018, Athens, Greece (R1-1802854) (Year: 2018).*
(Continued)

*Primary Examiner* — Ian N Moore
*Assistant Examiner* — Sun Jong Kim
(74) *Attorney, Agent, or Firm* — Harness, Dickey & Pierce, P.L.C.

(57) ABSTRACT

A method and an apparatus for configuring an uplink time-frequency resource set, and a method and an apparatus for receiving an uplink time-frequency resource set. The configuration method includes: configuring at least one uplink
(Continued)

S11 — configuring at least one of the uplink time-frequency resource sets for a user configured with an uplink transmission multiplexing mode, wherein the uplink time-frequency resource sets comprise time-frequency resource units on which the user performs rate matching S12 — transmitting one or more indication groups to the user to indicate at least one of the uplink time-frequency resource sets time-frequency resource set for a user configured with an uplink transmission multiplexing mode, wherein the uplink time-frequency resource set includes time-frequency resource units on which the user performs rate matching; and transmitting one or more indication groups to the user to indicate at least one of the uplink time-frequency resource sets, wherein each uplink time-frequency resource set is indicated by at least one of the indication groups.

13 Claims, 7 Drawing Sheets

(51) Int. Cl.
*H04L 5/00* (2006.01)
*H04L 41/0803* (2022.01)

(58) Field of Classification Search
CPC ... H04L 1/0067; H04L 5/0098; H04L 5/0094; H04W 72/04; H04W 72/12; H04W 72/0446; H04W 72/0453; H04W 72/1284
See application file for complete search history.

(56) References Cited

U.S. PATENT DOCUMENTS

| | | | |
|---|---|---|---|
| 2017/0223686 A1* | 8/2017 | You | H04W 72/042 |
| 2018/0092081 A1 | 3/2018 | Chen et al. | |
| 2019/0052432 A1* | 2/2019 | Islam | H04W 76/27 |
| 2019/0215118 A1* | 7/2019 | Moles Cases | H04L 41/0803 |
| 2019/0215720 A1 | 7/2019 | Li et al. | |
| 2019/0253300 A1* | 8/2019 | Munier | H04L 5/0051 |
| 2019/0254058 A1 | 8/2019 | Xie et al. | |
| 2020/0077392 A1 | 3/2020 | Deng et al. | |

FOREIGN PATENT DOCUMENTS

| | | |
|---|---|---|
| CN | 103391624 A | 11/2013 |
| CN | 106941724 A | 7/2017 |
| CN | 107040354 A | 8/2017 |
| CN | 107295659 A | 10/2017 |
| CN | 107734676 A | 2/2018 |
| CN | 107835063 A | 3/2018 |
| EP | 2806581 A1 | 11/2014 |
| EP | 3396886 A1 * | 10/2018 ............... H04L 5/00 |
| WO | WO-2017171398 A1 | 10/2017 |
| WO | WO-2017179915 A2 | 10/2017 |
| WO | WO-2018031846 A1 | 2/2018 |
| WO | WO-2018043960 A1 | 3/2018 |

OTHER PUBLICATIONS

U.S. Appl. No. 62/587,967, filed Nov. 17, 2017 (Year: 2017).*
International Search Report (in English and Chinese) and Written Opinion of the ISA (in Chinese) issued in PCT/CN2019/080907, dated Jun. 17, 2019; ISA/CN.
First Office Action of The State Intellectual Property Office of People's Republic of China issued in Application No. 201810304944. 6, dated Mar. 19, 2020 with English Translation.
Second Office Action of The State Intellectual Property Office of People's Republic of China issued in Application No. 201810304944. 6, dated Jul. 29, 2020 with English Translation.
Qualcomm Incorporated, "eMBB and URLLC Dynamic Multiplexing and Preemption Indication on the Uplink", 3GPP TSG-RAN WG1 #92, R1-1802854, Feb. 26-Mar. 2, 2018, Athens, Greece, Feb. 17, 2018 (Feb. 17, 2018), sections 1-3.
Huawei, et al. "On Pre-Emption Indication for DL Multiplexing of URLLC and eMBB", 3GPP TSG RAN WG1 Meeting #90bis, R1-1717081, Prague, Czech Republic, Oct. 9-13, 2017, Oct. 2, 2017 (Oct. 2, 2017), section 2.
Fujitsu, "Discussion on Preemption Indicator for Multiplexing eMBB and URLLC in Downlink", 3GPP TSR-RAN WG1 Meeting #88, R1-1701920, Athens, Greece, Feb. 13-17, 2017.
Sony, "Multiplexing data with different transmission durations for Uplink", 3GPP TSG RAN WG1 Meeting #90, R1-1712977, Prague, Czech Republic, Aug. 21-25, 2017.
Vivo, "Multiplexing data with different transmission durations", 3GPP TSG RAN WG1 Meeting NR #3, R1-1715646, Nagoya, Japan, Sep. 18-21, 2017.
Sony, "Remaining issues in Pre-emption Indicator", 3GPP TSG RAN WG1 Meeting #91, R1-1720463, Reno, Nevada, USA, Nov. 27-Dec. 1, 2017.
Qualcomm Incorporated, "URLLC DL pre-emption and UL suspension indication channel design", 3GPP TSG-RAN WG1 #91, R1-1720692, Reno, Nevada, USA, Nov. 27-Dec. 1, 2017.

* cited by examiner

| | |
|---|---|
| Subcarrier 11 | 4/5 |
| | 4/5 |
| | 2/3 |
| | 2/3 |
| | 0/1 |
| ⋮ | 0/1 |
| | 4/5 |
| | 4/5 |
| | 2/3 |
| | 2/3 |
| Subcarrier 1 | 0/1 |
| Subcarrier 0 | 0/1 |

Figure 4

METHOD AND APPARATUS FOR CONFIGURING UPLINK TIME-FREQUENCY RESOURCE SET, AND METHOD AND APPARATUS FOR RECEIVING UPLINK TIME-FREQUENCY RESOURCE SET

CROSS-REFERENCE TO RELATED APPLICATIONS

This application is the national phase of International Application No. PCT/CN2019/080907, filed on Apr. 2, 2019, which claims the benefit of priority to Chinese Patent Application No. 201810304944.6, filed on Apr. 4, 2018, and entitled "METHOD AND APPARATUS FOR CONFIGURING UPLINK TIME-FREQUENCY RESOURCE SET, AND METHOD AND APPARATUS FOR RECEIVING UPLINK TIME-FREQUENCY RESOURCE SET", the entire disclosures of which are incorporated herein by reference.

TECHNICAL FIELD

The present disclosure generally relates to mobile communication technology field, and more particularly, to a method and an apparatus for configuring uplink time-frequency resource set, and a method and an apparatus for receiving uplink time-frequency resource set.

BACKGROUND

In 5G communication services, to improve resource utilization, users with different data transmission durations may multiplex same time-frequency physical resources. For example, an Ultra Reliable & Low Latency Communication (URLLC) user has a short data transmission duration, which is a short-duration user; an enhanced Mobile Broadband (eMBB) user has a long data transmission duration, which is a long-duration user.

Specifically, to meet low latency requirements of a short-duration user, a base station may schedule the short-duration user on uplink time-frequency resources of a scheduled long-duration user. For example, when the base station is scheduling uplink time-frequency resources of an eMBB user, the base station may schedule an URLLC user to multiplex the uplink time-frequency resources of the eMBB user. However, when the eMBB user is performing uplink data transmission, it may conflict with the time-frequency resources occupied by the URLLC user transmitting the uplink Demodulation Reference Signal (DMRS), thereby affecting reliability of the URLLC user.

Therefore, embodiments of the present disclosure provide a method and an apparatus for configuring an uplink time-frequency resource set, and a method and an apparatus for receiving an uplink time-frequency resource set.

SUMMARY

Embodiments of the present disclosure solve this problem: when an eMBB user is performing uplink data transmission, it may conflict with time-frequency resources occupied by an URLLC user transmitting uplink DMRS, thereby affecting reliability of the URLLC user.

Embodiments of the present disclosure provide a method for configuring uplink time-frequency resource sets, including: configuring at least one of the uplink time-frequency resource sets for a user configured with an uplink transmission multiplexing mode, wherein the uplink time-frequency resource sets include time-frequency resource units on which the user performs rate matching; and transmitting one or more indication groups to the user to indicate the at least one of the uplink time-frequency resource sets, wherein one of the uplink time-frequency resource sets is indicated by at least one of the indication groups and each of the indication group includes a symbol level indication, a resource block level indication and a subcarrier level indication; and wherein the uplink transmission multiplexing mode means that the user can multiplex a time-frequency resource with one or more other users for uplink transmission.

Optionally, one or more reference ranges are configured for the uplink time-frequency resource sets, wherein one of the uplink time-frequency resource sets corresponds to one reference range.

Optionally, the symbol level indication is indicated by a first bitmap, a number of bits in the first bitmap is a total number of symbols included in the reference range, and each bit in the first bitmap indicates a symbol which indicates whether rate matching is performed on the symbol or not.

Optionally, each indication group uses a length of the first bitmap as a unit for periodic application in a time domain.

Optionally, the resource block level indication is indicated by a second bitmap, a number of bits in the second bitmap is a total number of physical resource blocks included in the reference range, and each bit in the second bitmap indicates a physical resource block which indicates whether rate matching is performed on the physical resource block or not.

Optionally, the subcarrier level indication is indicated by a third bitmap, a number of bits in the third bitmap is a total number of subcarriers included in a physical resource block within the reference range, and each bit in the third bitmap indicates a subcarrier which indicates whether rate matching is performed on the subcarrier or not.

Optionally, the subcarrier level indication is performed by indicating a configuration type of a demodulation reference signal, a port number of the demodulation reference signal, and a subcarrier corresponding to the demodulation reference signal, indicating that rate matching is performed on a subcarrier index corresponding to a transmission port of the demodulation reference signal, wherein the subcarrier index corresponding to the transmission port of the demodulation reference signal is a subcarrier index in a physical resource block corresponding to a subcarrier interval of the user, and the subcarrier index is determined by the user calculating the configuration type, the port number, a subcarrier index corresponding to the demodulation reference signal and the subcarrier index of the user.

Optionally, the reference range is configured for the user by a base station through a Radio Resource Control (RRC) signaling or a default setting.

Optionally, the default setting is an active bandwidth portion of the user in a frequency domain, and a time slot for the user to perform uplink transmission in the time domain.

Optionally, the uplink time-frequency resource sets are configured for the user by the base station through the RRC signaling.

Optionally, the uplink time-frequency resource sets are configured for the user by combining the RRC signaling and a dynamic indication by the base station; before receiving the dynamic indication, the user performs rate matching on time-frequency resource units included in an uplink time-frequency resource set configured through the RRC signaling; and after receiving the dynamic indication, the user performs rate matching on time-frequency resource units included in an uplink time-frequency resource set configured through the dynamic indication.

Optionally, the dynamic indication is used to indicate at least one uplink time-frequency resource set for the user through a Media Access Control (MAC) control unit.

Optionally, the dynamic indication is used to indicate at least one uplink time-frequency resource set for the user through a downlink control information.

Embodiments of the present disclosure provide a method for receiving uplink time-frequency resource sets, including: receiving at least one of the uplink time-frequency resource sets; and performing rate matching on time-frequency resource units included in the uplink time-frequency resource sets, wherein one of the uplink time-frequency resource sets is indicated by at least one indication group and each of the indication group includes a symbol level indication, a resource block level indication and a subcarrier level indication.

Optionally, while receiving at least one of the uplink time-frequency resource sets, one or more reference ranges are received; or the one or more reference ranges are determined according to a default setting.

Embodiments of the present disclosure provide an apparatus for configuring uplink time-frequency resource sets, including: a memory and a processor, wherein a computer program that can be executed on the processor is stored in the memory, and when the processor executes the computer program, the following steps are performed: configuring at least one of the uplink time-frequency resource sets for a user configured with an uplink transmission multiplexing mode, wherein the uplink time-frequency resource sets include time-frequency resource units on which the user performs rate matching; and transmitting one or more indication groups to the user to indicate the at least one of the uplink time-frequency resource sets, wherein one of the uplink time-frequency resource sets is indicated by at least one of the indication groups and each of the indication group includes a symbol level indication, a resource block level indication and a subcarrier level indication; wherein the uplink transmission multiplexing mode means that the user can multiplex a time-frequency resource with one or more other users for uplink transmission.

Optionally, one or more reference ranges are configured for the uplink time-frequency resource sets, wherein one of the uplink time-frequency resource sets corresponds to one reference range.

Optionally, the symbol level indication is indicated by a first bitmap, a number of bits in the first bitmap is a total number of symbols included in the reference range, and each bit in the first bitmap indicates a symbol which indicates whether rate matching is performed on the symbol or not.

Optionally, each indication group uses a length of the first bitmap as a unit for periodic application in a time domain.

Optionally, the resource block level indication is indicated by a second bitmap, a number of bits in the second bitmap is a total number of physical resource blocks included in the reference range, and each bit in the second bitmap indicates a physical resource block which indicates whether rate matching is performed on the physical resource block or not.

Optionally, the subcarrier level indication is indicated by a third bitmap, a number of bits in the third bitmap is a total number of subcarriers included in a physical resource block within the reference range, and each bit in the third bitmap indicates a subcarrier which indicates whether rate matching is performed on the subcarrier or not.

Optionally, the subcarrier level indication is performed by indicating a configuration type of a demodulation reference signal, a port number of the demodulation reference signal, and a subcarrier corresponding to the demodulation reference signal, indicating that rate matching is performed on a subcarrier index corresponding to a transmission port of the demodulation reference signal, wherein the subcarrier index corresponding to the transmission port of the demodulation reference signal is a subcarrier index in a physical resource block corresponding to a subcarrier interval of the user, and the subcarrier index is determined by the user calculating the configuration type, the port number, a subcarrier index corresponding to the demodulation reference signal and the subcarrier index of the user.

Optionally, the reference range is configured for the user by a base station through a Radio Resource Control (RRC) signaling or a default setting.

Optionally, the default setting is an active bandwidth portion of the user in a frequency domain, and a time slot for the user to perform uplink transmission in the time domain.

Optionally, the uplink time-frequency resource sets are configured for the user by the base station through the RRC signaling.

Optionally, the uplink time-frequency resource sets are configured for the user by combining the RRC signaling and a dynamic indication by the base station; before receiving the dynamic indication, the user performs rate matching on time-frequency resource units included in a time-frequency resource set configured through the RRC signaling; and after receiving the dynamic indication, the user performs rate matching on time-frequency resource units included in an uplink time-frequency resource set configured through the dynamic indication.

Optionally, the dynamic indication is used to indicate at least one uplink time-frequency resource set to the user through a Media Access Control (MAC) control unit.

Optionally, the dynamic indication is used to indicate at least one uplink time-frequency resource set to the user through a downlink control information.

Embodiments of the present disclosure provide an apparatus for receiving uplink time-frequency resource sets, including: a memory and a processor, wherein a computer program that can be executed on the processor is stored in the memory, and when the processor executes the computer program, the following steps are performed: receiving at least one of the uplink time-frequency resource sets; and performing rate matching on time-frequency resource units included in the uplink time-frequency resource sets, wherein one of the uplink time-frequency resource sets is indicated by at least one indication group and each indication group includes a symbol level indication, a resource block level indication and a subcarrier level indication.

Compared with prior art, embodiments of the present disclosure may have following advantages.

A base station configures at least one of the uplink time-frequency resource sets for a user configured with an uplink transmission multiplexing mode, wherein the uplink time-frequency resource sets include time-frequency resource units on which the user performs rate matching. And the base station transmits one or more indication groups to the user to indicate at least one of the uplink time-frequency resource sets. Therefore, an eMBB user can acquire a position of the time-frequency resource of the uplink DMRS transmitted by an URLLC user, so as to perform rate matching, and avoid performing uplink data transmission on a corresponding time-frequency resource, which facilitates improving reliability of the URLLC user.

BRIEF DESCRIPTION OF THE DRAWINGS

FIG. 4 is a schematic diagram of a port pattern of an uplink demodulation reference signal according to an embodiment;

DETAILED DESCRIPTION

Figure 1:
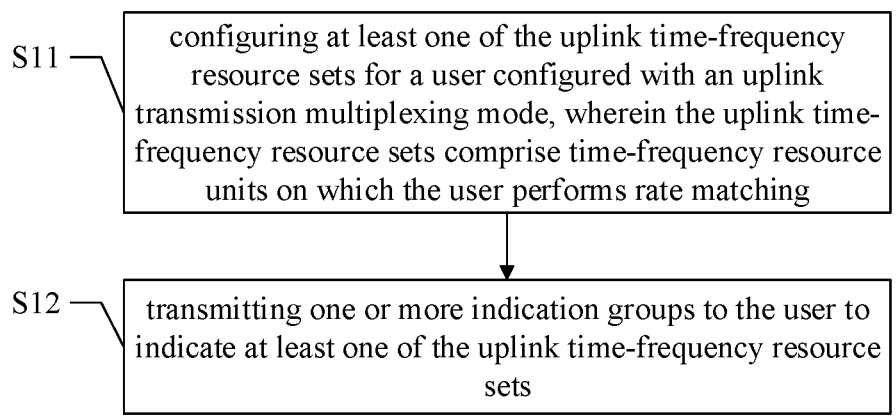
FIG. 1 is a flow chart of a method for configuring uplink time-frequency resource set according to an embodiment.

FIG. 1 is a flow chart of a method for configuring uplink time-frequency resource set according to an embodiment.

In S11, at least one of the uplink time-frequency resource sets is configured for a user configured with an uplink transmission multiplexing mode, wherein the uplink time-frequency resource sets include time-frequency resource units on which the user performs rate matching.

In S12, one or more indication groups are transmitted to the user to indicate at least one of the uplink time-frequency resource sets.

Wherein one of the uplink time-frequency resource sets is indicated by at least one of the indication groups and each of the indication group includes a symbol level indication, a resource block level indication and a subcarrier level indication; and the uplink transmission multiplexing mode means that the user can multiplex a time-frequency resource with one or more other users for uplink transmission.

In this way, the problem that time-frequency resources occupied by an eMBB user transmitting uplink data may conflict with the position of time-frequency resources occupied by an URLLC user transmitting uplink DMRS can be solved, thereby ensuring the reliability of the URLLC user.

In some embodiments, while configuring at least one of the uplink time-frequency resource sets for the user, a base station also configures one or more reference ranges for the uplink time-frequency resource sets, where each of the uplink time-frequency resource sets corresponds to one reference range. It should be noted that configuration of the uplink time-frequency resource sets and configuration of the one or more reference ranges do not need to be done at the same time by the base station.

In some embodiments, the reference range is configured for the user by the base station through a Radio Resource Control (RRC) signaling or a default setting. Furthermore, the base station configures a corresponding relation between the one or more reference ranges and the one or more indication groups for the user. After receiving an indication group, the user can determine a corresponding reference range according to the corresponding relation, and determine a corresponding uplink time-frequency resource set within the corresponding reference range according to the indication groups.

In one embodiment, an eMBB user is configured with one or more reference ranges, each of the one or more reference ranges is configured with one or more uplink time-frequency resource sets, and each of the uplink time-frequency resource sets is indicated by one or more indication groups.

Figure 2:
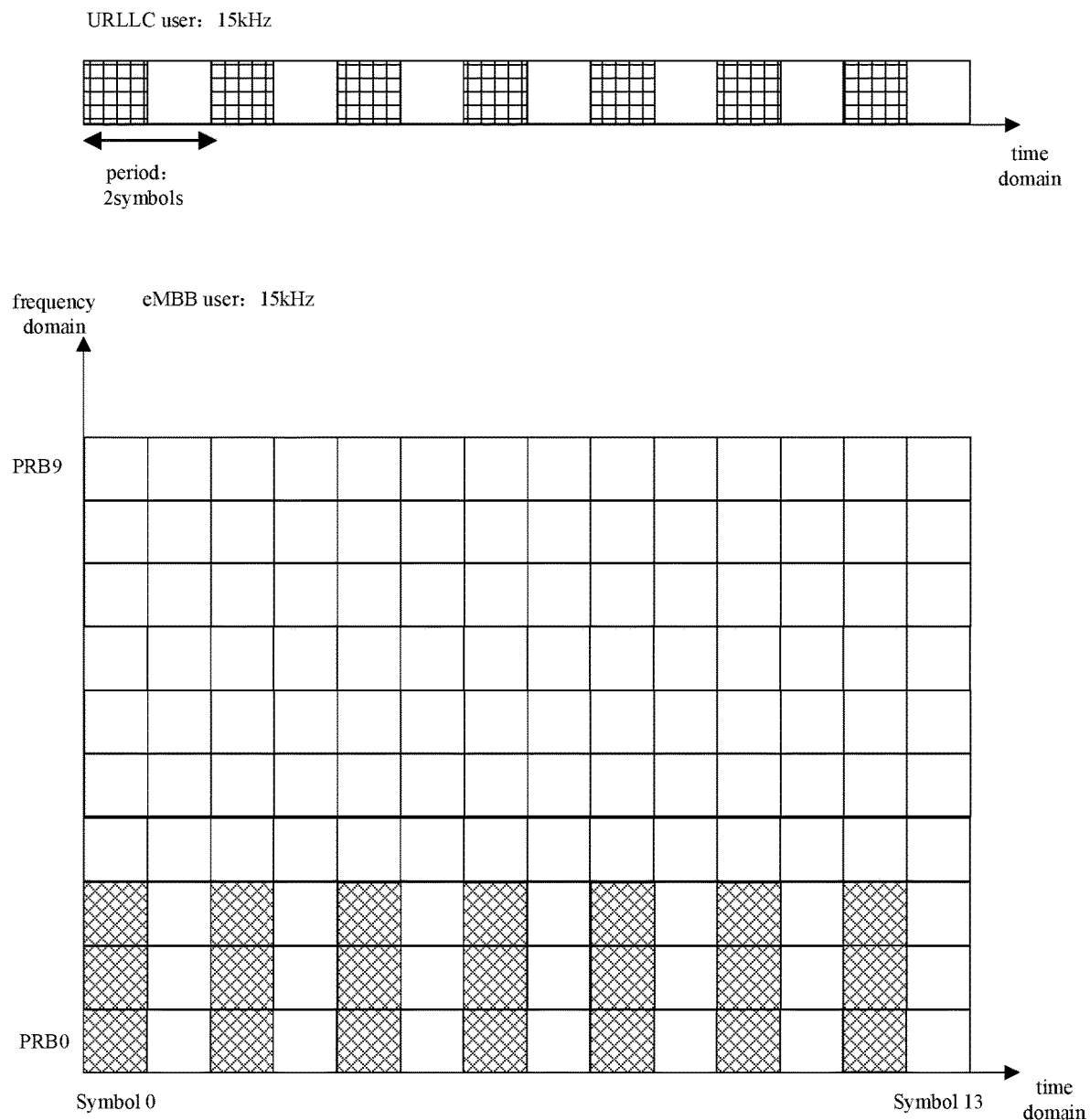
FIG. 2 is a schematic diagram of time-frequency resource distribution during rate matching according to an embodiment.
Figure 3:
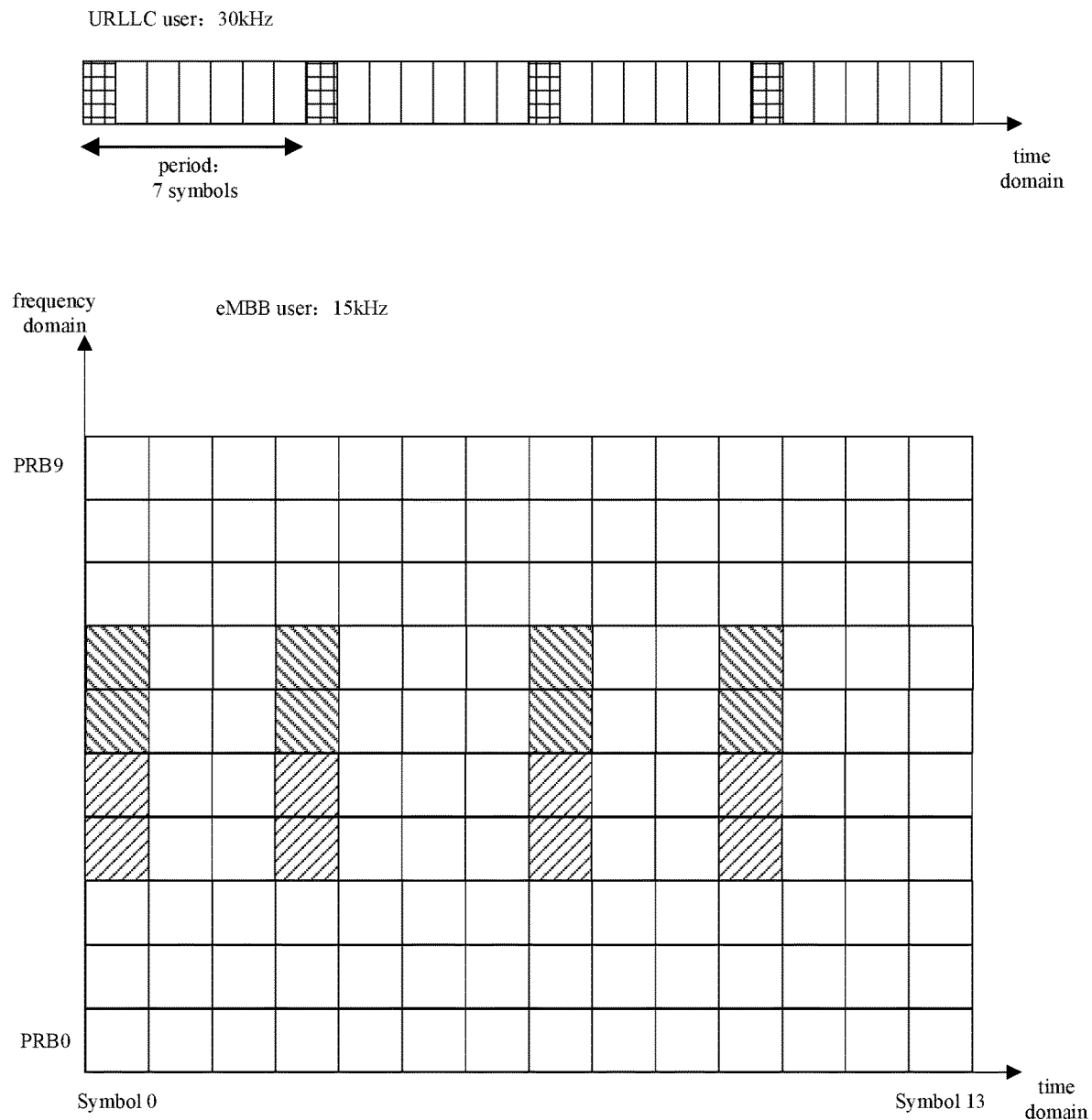
FIG. 3 is a schematic diagram of time-frequency resource distribution during rate matching according to an embodiment.

Specifically, referring to FIGS. 2, 3 and 4, FIGS. 2 and 3 are schematic diagrams of time-frequency resource distribution during rate matching according to an embodiment, and FIG. 4 is a schematic diagram of a port pattern of an uplink demodulation reference signal according to an embodiment.

In a first embodiment, a working subcarrier interval of an eMBB user is 15 kHz. A base station configures an uplink transmission multiplexing mode for the eMBB user and configures one or more uplink time-frequency resource sets and one or more reference ranges for the user through a RRC, wherein the eMBB user performs rate matching on time-frequency resource units included in the uplink time-frequency resource sets.

Specifically, there is an URLLC user which is called a first URLLC user. Referring to FIG. 2, the first URLLC user is configured to do uplink transmission according to a configured grant UL transmission type 1, a subcarrier interval of the first URLLC user is 15 kHz, and a transmission resource period is two symbols. Positions of time-frequency resources transmitted in each transmission resource period are as follows: physical resource block PRB0-PRB2 in a frequency domain, first two symbols in each period in a time domain, and one symbol for an uplink DMRS; and an uplink DMRS port number configured for the first URLLC user is port 1 in an uplink DMRS configuration type 2, which is located on four subcarriers 0, 1, 6 and 7 in a PRB.

In the first embodiment, the base station indicates a time-frequency resource position of the uplink DMRS of the first URLLC user to the eMBB user by configuring a first uplink time-frequency resource set, and also configures a first reference range for the user. The first reference range is a reference range of the uplink time-frequency resource set, and is PRB0-PRB9 in the frequency domain, where a PRB index may be a public PRB index at a cell level or a dedicated PRB index for an active bandwidth portion of the eMBB user. The reference range is a time slot corresponding to the working subcarrier interval of the eMBB user in the time domain. The first uplink time-frequency resource set is indicated by an indication group, which is named as the first indication group.

Specifically, in the first indication group, a symbol level indication is indicated by a first bitmap, a number of bits in the first bitmap is a total number of symbols included in the reference range that is 14 bits, and each bit in the first bitmap corresponds to a symbol in the time domain within the reference range. Referring to FIG. 2, according to a time-domain transmission position of the uplink DMRS of the first URLLC user, the first bitmap can be determined as [10101010101010]. Specifically, the first bitmap may be shown from a Most Significant Bit (MSB) to a Least Significant Bit (LSB) which indicates symbols in the time domain from small to large or from large to small, so the first bit bitmap may also be [01010101010101].

Furthermore, in the first indication group, a resource block level indication is indicated by a second bitmap, a number of bits in the second bitmap is a total number of PRBs included in the reference range that is 10 bits, and each bit in the second bitmap corresponds to a PRB in the frequency domain within the reference range. Referring to FIG. 2, according to a frequency-domain transmission position of the uplink DMRS of the first URLLC user, the second bitmap can be determined as [1110000000]. Similarly, the second bitmap can also be determined as [0000000111].

Furthermore, in the first indication group, a subcarrier level indication is indicated by a third bitmap, a number of bits in the third bitmap is a total number of subcarriers included in a PRB, that is 12 bits, and each bit corresponds to one subcarrier of one PRB within the reference range. Referring to FIG. 4, according to the uplink DMRS port pattern of the first URLLC user, and since the uplink DMRS port number configured for the first URLLC user is port 1 in the uplink DMRS configuration type 2, the third bitmap can be determined as [110000110000].

In this embodiment, the subcarrier level indication may also be indicated by indicating the uplink DMRS configuration type, the uplink DMRS port number and the subcarrier interval corresponding to the DMRS, which means that rate matching is performed on a subcarrier index corresponding to a DMRS transmission port, wherein the subcarrier index is calculated and determined by the user according to the configured DMRS configuration type, the DMRS port number, the subcarrier interval corresponding to the DMRS and the subcarrier interval corresponding to the user. Specifically, a highest bit is used to indicate the uplink DMRS configuration type. If the highest bit is 0, the uplink DMRS configuration type is type 1; and if the highest bit is 1, the uplink DMRS configuration type is type 2. In addition, X bits are used to indicate the uplink DMRS port number. In this embodiment, a total number of ports of the uplink DMRS which occupies one symbol and configured with configuration type 2, is 6, in other words, X equals 6 and the uplink DMRS port number is indicated by the middle six bits. The lowest two bits are used to indicate a corresponding relationship between the subcarrier interval of the DMRS and the subcarrier interval of the eMBB user, where 00 indicates that the subcarrier interval of the DMRS is same as the subcarrier interval of the eMBB user, 01 indicates that the subcarrier interval of the DMRS is twice that of the eMBB user, 10 indicates the subcarrier interval of the DMRS is four times that of the eMBB user4 Times, and 11 means the subcarrier interval of the DMRS is eight times that of the eMBB user. In summary, the uplink DMRS port number configured with the uplink DMRS configuration type 2 and port 1 can be shown by 9 bits, which is [101000000]. According to the received subcarrier level indication, the eMBB user determines the DMRS configuration type 2 by the highest bit. Therefore, the port pattern is as shown in FIG. 4. The DMRS port number can be determined as 1 according to the middle six bits 010000, and subcarrier indexes corresponding to the DMRS subcarrier interval are 0, 1, 6 and 7. According to the value of 00 in the lowest two bits, the subcarrier interval of the DMRS can be determined same as the subcarrier interval of the eMBB user. Therefore, the eMBB user can determine that the subcarrier level indication is the subcarrier index of a next physical resource block of the subcarrier interval of the eMBB user: 0, 1, 6 and 7.

In the embodiment, the base station transmits the first indication group to the eMBB user through the RRC signaling. According to the first indication group, the user can determine that rate matching is performed on symbols 0, 2, 4, 6, 8, 10 and 12 in each time slot, on PRB0-PRB3 in the frequency domain, and on subcarriers 0, 1, 6 and 7 in each PRB, on which uplink data is not transmitted.

Referring to FIG. 3, there is another URLLC user in the system, which is names as a second URLLC user. The second URLLC user is configured to do uplink transmission according to a configured grant UL transmission type 1, has a subcarrier interval of 30 kHz, and has a transmission resource period of 7 symbols. A time domain resource position transmitted in each period is first 7 symbols in the period, and a frequency domain resource position transmitted in each period is two PRBs. Since the subcarrier interval of the eMBB user is 15 kHz, a symbol length of the second URLLC user is half that of the eMBB user, and a size of one PRB of the second URLLC user is twice that of the eMBB user.

In the embodiment, the base station indicates the eMBB user a time-frequency resource position of an uplink DMRS of the second URLLC user through a second uplink time-frequency resource set, and also configures the first reference range for the eMBB user. The second uplink time-frequency resource set is indicated by an indication group, which is named as a second indication group.

In the embodiment, a first PRB of the second URLLC user corresponds to frequency domain positions PRB3-PRB4 and a second PRB of the second URLLC user corresponds to frequency domain positions PRB5-PRB6 within the first reference range.

In the embodiment, the uplink DMRS of the second URLLC user is configured as a symbol, and an uplink DMRS port number configured for the second URLLC user is port 2 in the uplink DMRS configuration type 2, which is located on four subcarriers 2, 3, 8 and 9 in a PRB in a 30 kHz subcarrier interval.

Specifically, in the second indication group, a symbol level indication is indicated by a first bitmap which includes 14 bits, and each bit in the first bitmap corresponds to a symbol in the time domain within the reference range, wherein the symbol corresponds to the working subcarrier interval of the eMBB user. Since one transmission period of the second URLLC user is 7 symbols, and a symbol length of one time domain is half that of the eMBB user, one time slot of the eMBB user includes 4 transmission periods of the second URLLC user. According to a time-domain transmission position of the uplink DMRS of the second URLLC user, the first bitmap can be determined as [10010001001000]. Similarly, the first bitmap may also be [00010010001001].

Furthermore, in the second indication group, a resource block level indication is indicated by a second bitmap, a number of bits in the second bitmap is a total number of PRBs included in the reference range that is 10 bits, and each bit in the second bitmap corresponds to a PRB in the frequency domain within the reference range. Referring to FIG. 3, according to a frequency-domain transmission position of the uplink DMRS of the second URLLC user, the second bitmap can be determined as [0001111000].

Furthermore, in the second indication group, a subcarrier level indication is indicated by a third bitmap, a number of bits in the third bitmap is a total number of subcarriers included in a PRB, that is 12 bits, and each bit corresponds to one subcarrier of one PRB within the reference range.

According to an uplink DMRS port pattern of the second URLLC user, a subcarrier index in a PRB at a subcarrier interval of 30 kHz is: 2, 3, 8, and 9. Considering that a size of a PRB at a subcarrier interval of 30 kHz is twice the size of a PRB at a subcarrier interval of 15 kHz, after conversion, subcarrier 2, subcarrier 3, subcarrier 8 and subcarrier 9 in a first PRB of the second URLLC user correspond to subcarrier 4, subcarrier 5, subcarrier 6 and subcarrier 7 in PRB3, and correspond to subcarrier 4, subcarrier 5, subcarrier 6, and subcarrier 7 in PRB4 within the first reference range. Subcarrier 2, subcarrier 3, subcarrier 8 and subcarrier 9 in a second PRB of the second URLLC user correspond to subcarrier 4, subcarrier 5, subcarrier 6 and subcarrier 7 in PRB5, and correspond to subcarrier 4, subcarrier 5, subcarrier 6, and subcarrier 7 in PRB6 within the first reference range. Therefore, the third bitmap indicates subcarriers 4-7 of a PRB within the first reference range and can be determined as [000011110000].

In the embodiment, the base station transmits the second indication group to the eMBB user through the RRC signaling. According to the second indication group, the user can determine that rate matching is performed on symbols 0, 3, 7 and 10 in each time slot, on PRB0-PRB3 in the frequency domain, and on subcarriers 4, 5, 6, and 7 in each PRB, on which uplink data is not transmitted.

In one embodiment, the uplink time-frequency resource sets are configured for the user by combining the RRC signaling and a dynamic indication by the base station. Before receiving the dynamic indication, the user performs rate matching on time-frequency resource units included in an uplink time-frequency resource set configured through the RRC signaling; and after receiving the dynamic indication, the user performs rate matching on time-frequency resource units included in an uplink time-frequency resource set configured through the dynamic indication.

Specifically, referring to FIGS. 2, 3 and 4, that the uplink time-frequency resource sets are configured for the user by combining the RRC signaling and the dynamic indication by the base station is described in following embodiments.

In a second embodiment, a working subcarrier interval of an eMBB user is 15 kHz. A base station configures an uplink transmission multiplexing mode for the eMBB user, and configures uplink time-frequency resource sets and a reference range for the eMBB user by combining an RRC signaling and a dynamic indication.

In the embodiment, the base station configures the uplink time-frequency resource sets for the eMBB user by combining the RRC signaling and the dynamic indication, wherein the dynamic indication is used to indicate one or more uplink time-frequency resource sets to the eMBB user through a MAC Control Element (MAC CE). Referring to FIGS. 2 and 3, the base station configures two uplink time-frequency resource sets for the eMBB user through the RRC signaling, which are named as a first uplink time-frequency resource set and a second uplink time-frequency resource set, and configures a first reference range for the eMBB user. The first uplink time-frequency resource set and the second uplink time-frequency resource set are respectively indicated by a first indication group and a second indication group. The first indication group and the second indication group respectively include a first bitmap, a two bitmap and a third bitmap. The first reference range is PRB0-PRB9 in a frequency domain, where a PRB index may be a public PRB index at a cell level or a dedicated PRB index for an active bandwidth portion of the eMBB user. The reference range is a time slot corresponding to the working subcarrier interval of the eMBB user in the time domain.

According to the first embodiment described above, the first bitmap of the first indication group is [10101010101010], the second bitmap of the first indication group is [1110000000], and the third bitmap of the first indication group is [110000110000]. The first bitmap of the second indication group is [10010001001000], the second bitmap of the second indication group is [0001111000], and the third bitmap of the second indication group is [000011110000].

Similarly, in order from a Most Significant Bit (MSB) to a Least Significant Bit (LSB), each bitmap may indicate symbols in the time domain from small to large or from large to small according to embodiments of the present disclosure, which will not be described in detail here.

In this embodiment, before receiving any MAC CE indication, the eMBB user performs rate matching on time-frequency resource units included in the first uplink time-frequency resource set and the second uplink time-frequency resource set configured by the RRC signaling.

At a first moment, the eMBB user receives a MAC CE indication which only indicates the first uplink time-frequency resource set. Therefore, after the first moment, the eMBB user will perform rate matching on the time-frequency resource units included in the first uplink time-frequency resource set. At a second moment, the eMBB user receives another MAC CE indication which only indicates the second uplink time-frequency resource set. Therefore, after the second moment, the eMBB user will perform rate matching on the time-frequency resource units included in the second uplink time-frequency resource set.

In a third embodiment, a working subcarrier interval of an eMBB user is 15 kHz. A base station configures an uplink transmission multiplexing mode for the eMBB user, and configures uplink time-frequency resource sets and a reference range for the eMBB user by combining an RRC signaling and a dynamic indication.

In the embodiment, the base station configures the uplink time-frequency resource sets for the eMBB user by combining the RRC signaling and the dynamic indication, wherein the dynamic indication is to used to indicate one or more uplink time-frequency resource sets to the eMBB user through a Downlink Control Information (DCI). Referring to FIGS. 2 and 3, the base station configures two uplink time-frequency resource sets for the eMBB user through the RRC signaling, which are named as a first uplink time-frequency resource set and a second uplink time-frequency resource set, and configures a first reference range for the eMBB user. The first uplink time-frequency resource set and the second uplink time-frequency resource set are respectively indicated by a first indication group and a second indication group. The first indication group and the second indication group each include a first bitmap, a two bitmap and a third bitmap. The first reference range is PRB0-PRB9 in a frequency domain, where a PRB index may be a public PRB index at a cell level or a dedicated PRB index for an active bandwidth portion of the eMBB user. The reference range is a time slot corresponding to the working subcarrier interval of the eMBB user in the time domain.

According to the first embodiment described above, the first bitmap of the first indication group is [10101010101010], the second bitmap of the first indication group is [1110000000], and the third bitmap of the first indication group is [110000110000]. The first bitmap of the second indication group is [10010001001000], the second bitmap of the second indication group is [0001111000], and the third bitmap of the second indication group is [000011110000].

Similarly, in order from a MSB to a LSB, each bitmap may indicate symbols in the time domain from small to large or from large to small according to embodiments of the present disclosure, which will not be described in detail here.

In this embodiment, before receiving any DCI indication, the eMBB user performs rate matching on time-frequency resource units included in the first uplink time-frequency resource set and the second uplink time-frequency resource set configured by the RRC signaling.

At a first moment, the eMBB user receives a DCI indication. The DCI indication includes two information bits. When the two information bits are 10, the DCI indication only indicates the first uplink time-frequency resource set. Therefore, after the first moment, the eMBB user will perform rate matching on the time-frequency resource units included in the first uplink time-frequency resource set. At a second moment, the eMBB user receives another DCI indication which is 01 and indicates only the second uplink time-frequency resource set. Therefore, after the second moment, the eMBB user will perform rate matching on the time-frequency resource units included in the second uplink time-frequency resource set.

In an embodiment, the DCI indication for indicating the uplink time-frequency resource sets may be configured with a new DCI format or multiplex an existing DCI format, and a monitoring period of the DCI indication may be configured by the base station.

Figure 5:
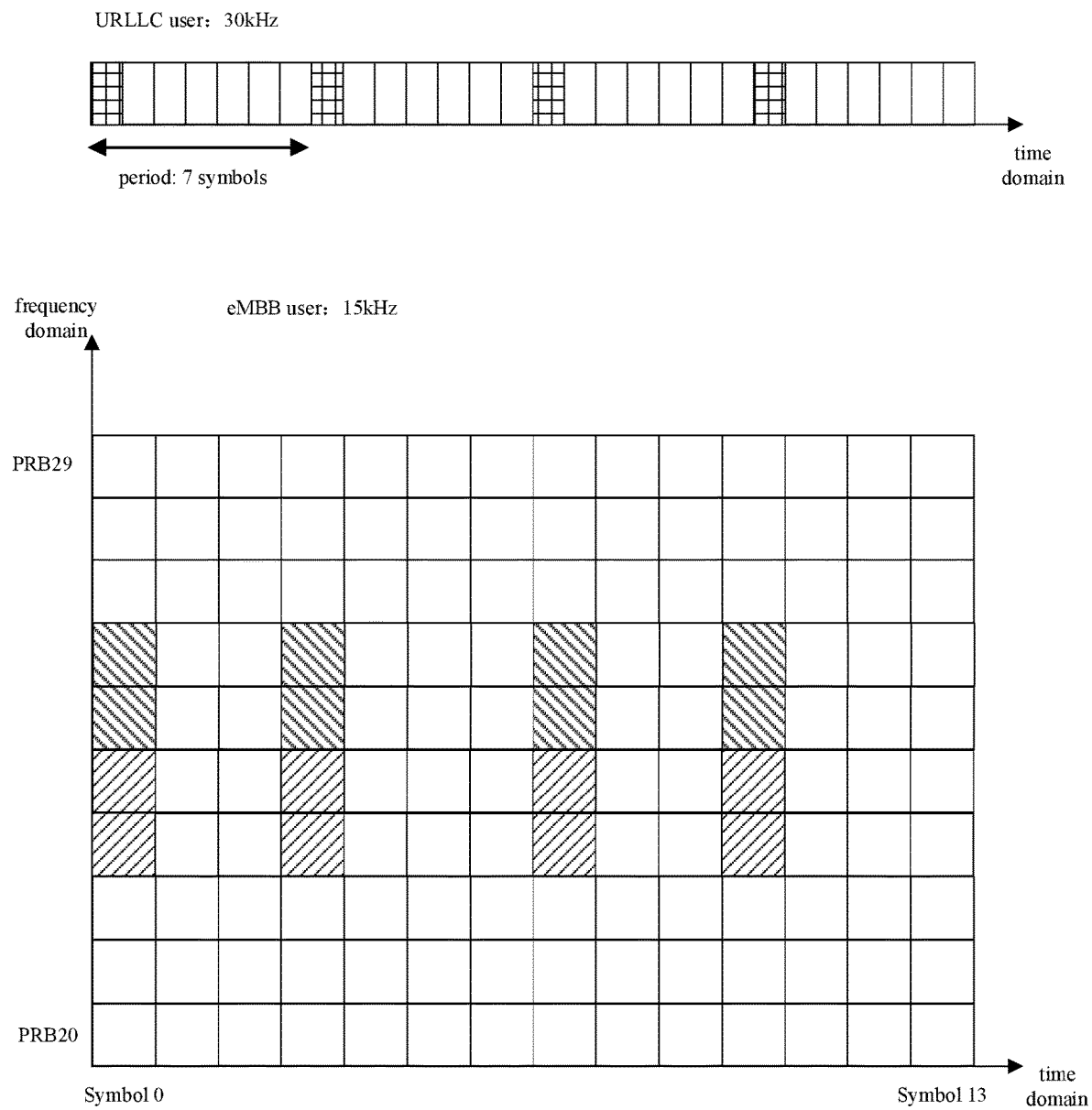
FIG. 5 is a schematic diagram of time-frequency resource distribution during rate matching according to an embodiment.

In an embodiment, an eMBB user may be configured with more than one reference range. Referring to FIGS. 2, 3 and 5, FIG. 5 is a schematic diagram of time-frequency resource distribution during rate matching according to an embodiment.

In a fourth embodiment, a working subcarrier interval of an eMBB user is 15 kHz. A base station configures an uplink transmission multiplexing mode for the eMBB user, and configures uplink time-frequency resource sets and reference ranges for the eMBB user through an RRC signaling. The eMBB user performs rate matching on time-frequency resource units included in the uplink time-frequency resource sets.

In this embodiment, the base station configures a first uplink time-frequency resource set and a second uplink time-frequency reference resource set for the eMBB user through the RRC signaling, and also configures a first reference range and a second reference range. The first uplink time-frequency resource set and the second uplink time-frequency resource set are respectively indicated by a first indication group and a second indication group. The first indication group and the second indication group respectively include a first bitmap, a second bitmap and a third bitmap.

In this embodiment, referring to FIG. 2, the first reference range is PRB0-PRB9 in a frequency domain, where a PRB index may be a public PRB index at a cell level or a dedicated PRB index for an active bandwidth portion of the eMBB user. The first reference range is a time slot corresponding to the working subcarrier interval of the eMBB user in the time domain. Referring to FIG. 5, the second reference range is PRB20-PRB29 in a frequency domain, where a PRB index may be a public PRB index at a cell level or a dedicated PRB index for an active bandwidth portion of the eMBB user. The second reference range is a time slot corresponding to the working subcarrier interval of the eMBB user in the time domain.

According to the first embodiment described above, the first bitmap of the first indication group is [10101010101010], the second bitmap of the first indication group is [1110000000], and the third bitmap of the first indication group is [110000110000]. The first bitmap of the second indication group is [10010001001000], the second bitmap of the second indication group is [0001111000], and the third bitmap of the second indication group is [000011110000].

Similarly, in order from a MSB to a LSB, each bitmap may indicate symbols in the time domain from small to large or from large to small according to embodiments of the present disclosure, which will not be described in detail here.

Figure 6:
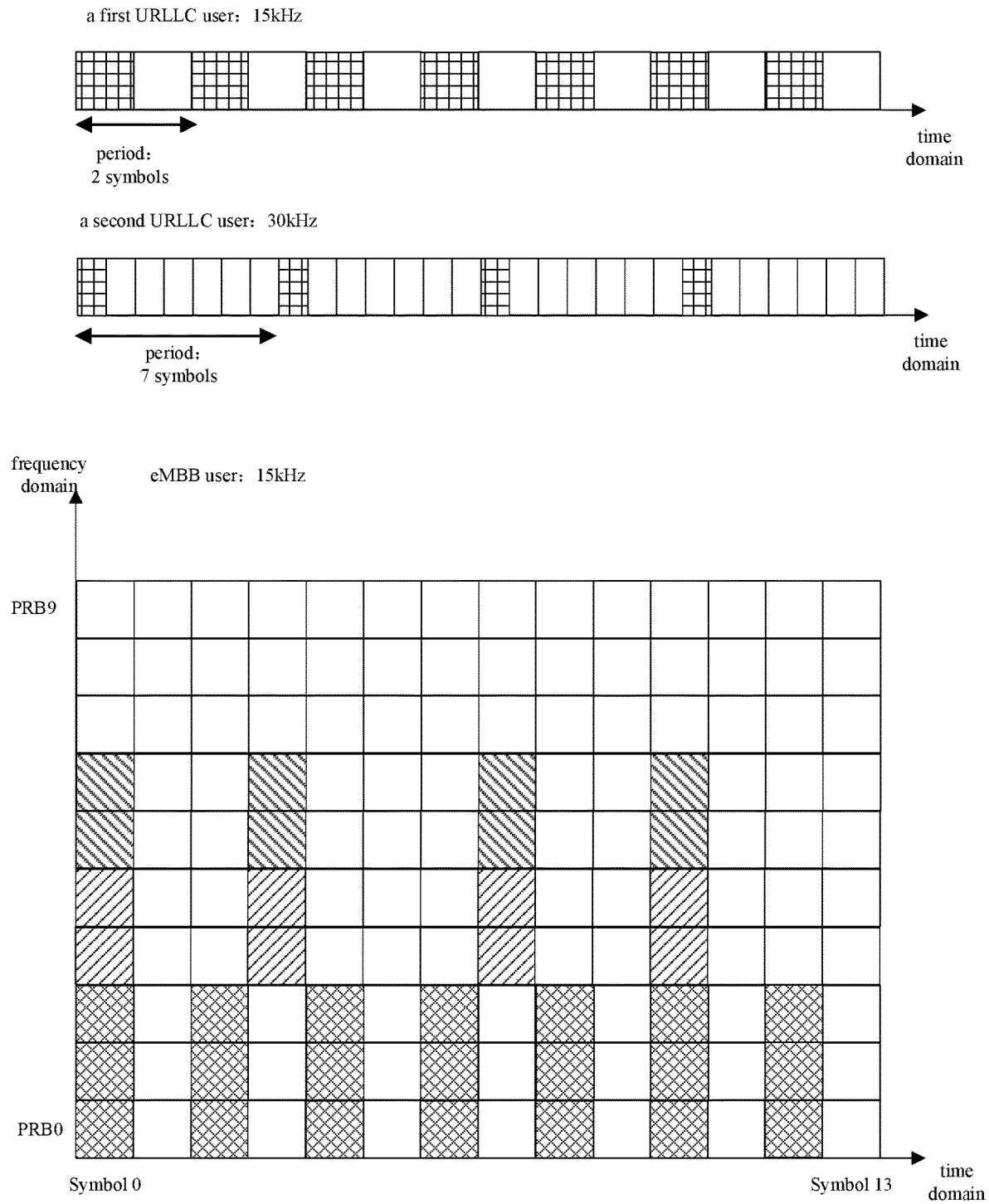
FIG. 6 is a schematic diagram of time-frequency resource distribution during rate matching according to an embodiment.

In some embodiments, uplink time-frequency resources sets configured for an eMBB user may be indicated by a plurality of indication groups. Referring to FIGS. 4 and 6, FIG. 6 is a schematic diagram of time-frequency resource distribution during rate matching according to an embodiment.

In a fifth embodiment, a working subcarrier interval of an eMBB user is 15 kHz. A base station configures an uplink transmission multiplexing mode for the eMBB user, and configures uplink time-frequency resource sets and a reference range for the eMBB user through an RRC signaling. The eMBB user performs rate matching on time-frequency resource units included in the uplink time-frequency resource sets.

In this embodiment, referring to FIG. 6, the base station configures an uplink time-frequency resource set for the eMBB user through the RRC signaling, wherein the uplink time-frequency resource set corresponds to time-frequency positions of an uplink DMRS of a first URLLC user and a second URLLC user. The base station also configures a first reference range for the eMBB user. The first reference range is PRB0-PRB9 in a frequency domain, where a PRB index may be a public PRB index at a cell level or a dedicated PRB index for an active bandwidth portion of the eMBB user. The reference range is a time slot corresponding to the working subcarrier interval of the eMBB user in a time domain.

In this embodiment, the uplink time-frequency resource set is jointly indicated by a first indication group and a second indication group, wherein the first indication group and the second indication group respectively include a first bitmap, a second bitmap, and a third bitmap.

According to the first embodiment described above, the first bitmap of the first indication group is [10101010101010], the second bitmap of the first indication group is [1110000000], and the third bitmap of the first indication group is [110000110000]. The first bitmap of the second indication group is [10010001001000], the second bitmap of the second indication group is [0001111000], and the third bitmap of the second indication group is [000011110000].

Similarly, in order from a MSB to a LSB, each bitmap may indicate symbols in the time domain from small to large or from large to small according to embodiments of the present disclosure, which will not be described in detail here.

In the embodiments described above, each indication group uses the length of the first bitmap as a unit in the time domain for periodic application, in other words, the eMBB user is periodically configured with the uplink time-frequency resource sets in the time domain and the periodic length is the length of the first bitmap. And rate matching is performed on the time-frequency resource units included in the uplink time-frequency resource sets.

Figure 7:
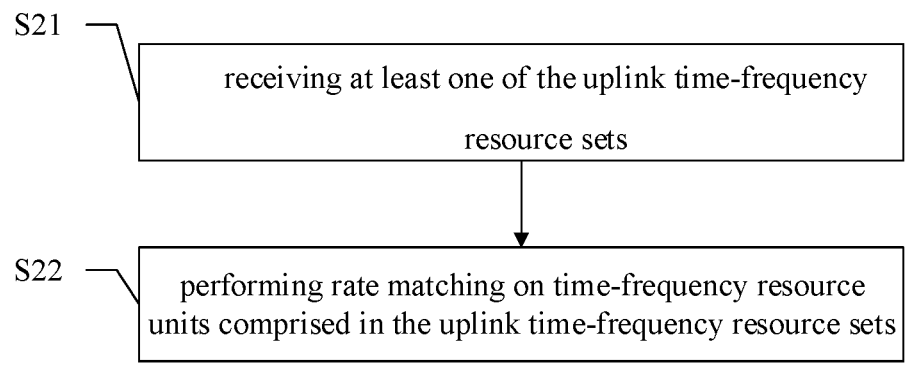
FIG. 7 is a flow chart a method for receiving uplink time-frequency resource set according to an embodiment.

Referring to FIG. 7, FIG. 7 is a flow chart of a method for receiving uplink time-frequency resource set according to an embodiment. The method for receiving uplink time-frequency resource sets includes the following steps.

In S21, at least one of the uplink time-frequency resource sets is received.

In S22, rate matching is performed on time-frequency resource units included in the uplink time-frequency resource sets.

Wherein one of the uplink time-frequency resource sets is indicated by at least one indication group and each of the indication group includes a symbol level indication, a resource block level indication and a subcarrier level indication.

In an embodiments, the eMBB user receives at least one reference range while receiving at least one of the uplink time-frequency resource sets, or determines at least one reference range according to a default setting.

In this embodiment, more details about working principle and working mode of the method for receiving the uplink time-frequency resource sets may refer to related descriptions with reference to FIGS. 1 to 6 described above, which will not be described in detail herein.

Figure 8:
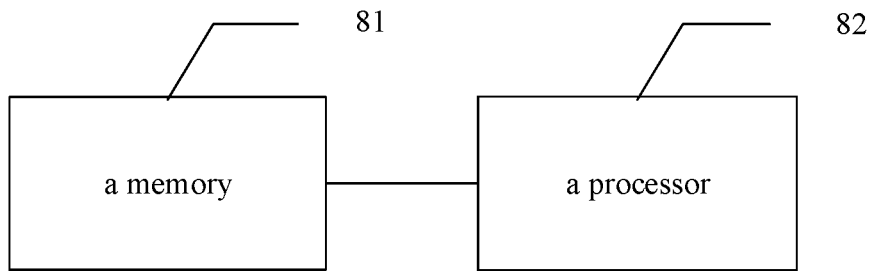
FIG. 8 is a structural diagram of an apparatus for configuring uplink time-frequency resource set according to an embodiment.

FIG. 8 is a structural diagram of an apparatus for configuring uplink time-frequency resource sets according to an embodiment, wherein the apparatus includes a memory 81 and a processor 82. A computer program that can be executed on the processor 82 is stored in the memory 81. The computer program stored on the memory 81 is a program that implements the steps of the method described above. The processor 82 executes the computer program to realize the steps of the method. The memory 81 may include: a Read-Only Memory (ROM), a Random Access Memory (RAM), a magnetic disk or an optical disk, etc. The steps of the method may refer to related descriptions described above, which will not be repeated in detail herein.

Figure 9:
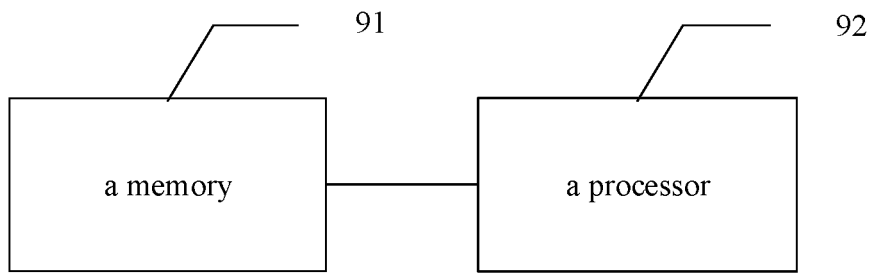
FIG. 9 is a structural diagram of an apparatus for receiving uplink time-frequency resource set according to an embodiment.

FIG. 9 is a structural diagram of an apparatus for receiving uplink time-frequency resource set according to an embodiment. A computer program that can be executed on a processor 92 is stored in a memory 91. The computer program stored on the memory 91 is a program that implements the steps of the method described above. The processor 92 executes the computer program to realize the steps of the method. The memory 91 may include: a ROM, a RAM, a magnetic disk or an optical disk, etc. The steps of the method may refer to related descriptions described above, which will not be repeated in detail herein.

Those skilled in the art can understand that a part or all of the methods described in the embodiments of the present disclosure can be performed by a computer program instructing a related hardware. The computer program may be stored in a computer-readable storage medium, and the storage medium may include a ROM, a RAM, a magnetic disk or an optical disk, etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for configuring uplink time-frequency resource sets, wherein the method applied to a base station, comprising:

configuring at least one of the uplink time-frequency resource sets for a User Equipment (UE) configured with an uplink transmission multiplexing mode, wherein the uplink time-frequency resource sets comprise time-frequency resource units on which the UE performs rate matching;

transmitting one or more indication groups to the UE to indicate the at least one of the uplink time-frequency resource sets;

configuring one or more reference ranges for the uplink time-frequency resource sets; and configuring a corresponding relationship between the one or more reference ranges and the one or more indication groups, wherein each of the uplink time-frequency resource sets corresponds to a reference range of the one or more reference ranges, so that the UE receives the one or more indication groups, determines a corresponding reference range of the one or more reference ranges according to the corresponding relationship, and determines each of the uplink time-frequency resource sets within the determined corresponding reference range based on the one or more indication groups, wherein one of the uplink time-frequency resource sets is indicated by at least one of the indication groups and each of the indication groups comprises a symbol level indication, a resource block level indication and a subcarrier level indication, wherein the symbol level indication, the resource block level indication and the subcarrier level indication in combination are used by the UE to determine at least one resource on which the UE performs rate matching; and wherein the uplink transmission multiplexing mode means that the UE can multiplex a time-frequency resource with one or more other UEs for uplink transmission, wherein the resource block level indication is indicated by a second bitmap, a number of bits in the second bitmap is a total number of physical resource blocks comprised in the reference range, and each bit in the second bitmap indicates a physical resource block which indicates whether the rate matching is performed on the physical resource block or not, wherein the subcarrier level indication is indicated by a third bitmap which belongs to a data type of a string, a number of bits in the third bitmap is a total number of subcarriers comprised in a physical resource block within the reference range, and each bit in the third bitmap indicates a subcarrier which indicates whether the rate matching is performed on the subcarrier or not.

2. The method according to claim 1, wherein the symbol level indication is indicated by a first bitmap, a number of bits in the first bitmap is a total number of symbols comprised in the reference range, and each bit in the first bitmap indicates a symbol which indicates whether the rate matching is performed on the symbol or not.

3. The method according to claim 2, wherein each indication group uses a length of the first bitmap as a unit for periodic application in a time domain.

4. The method according to claim 1, wherein the subcarrier level indication is performed by indicating a configuration type of a demodulation reference signal, a number of a transmission port of the demodulation reference signal, and a subcarrier interval corresponding to the demodulation reference signal, so that the rate matching is performed on a subcarrier index corresponding to the transmission port of the demodulation reference signal, wherein the subcarrier index corresponding to the transmission port of the demodulation reference signal is a subcarrier index in a physical resource block within a subcarrier interval corresponding to the UE, and the subcarrier index is determined by calculation of the UE based on the configuration type, the number of the transmission port, the subcarrier interval corresponding to the demodulation reference signal and the subcarrier interval of the UE.

5. The method according to claim 1, wherein the reference range is configured for the UE through a Radio Resource Control (RRC) signaling or a default setting.

6. The method according to claim 1, wherein the uplink time-frequency resource sets are configured for the UE by the base station through a Radio Resource Control (RRC) signaling.

7. A method for receiving uplink time-frequency resource sets, wherein the method applied to a User Equipment (UE), comprising:
receiving at least one of the uplink time-frequency resource sets, wherein each of the uplink time-frequency resource sets is indicated by at least one indication group which comprises a symbol level indication, a resource block level indication and a subcarrier level indication, wherein the symbol level indication, the resource block level indication and the subcarrier level indication in combination are used by the UE to determine at least one resource on which the UE performs rate matching;
determining at least one reference range according to a default setting, or receiving the at least one reference range while receiving the at least one of the uplink time-frequency resource sets;
determining a corresponding relationship configured between the at least one reference range and the at least one indication group, wherein each of the uplink time-frequency resource sets corresponds to a reference range of the at least one reference range, so that the UE receives the at least one indication group;
determining a corresponding reference range of the at least one reference range according to the corresponding relationship;
determining each of the uplink time-frequency resource sets within the determined corresponding reference range based on the at least one indication group; and
performing rate matching on time-frequency resource units comprised in the uplink time-frequency resource sets,
wherein the resource block level indication is indicated by a second bitmap, a number of bits in the second bitmap is a total number of physical resource blocks comprised in the reference range, and each bit in the second bitmap indicates a physical resource block which indicates whether the rate matching is performed on the physical resource block or not,
wherein the subcarrier level indication is indicated by a third bitmap which belongs to a data type of a string, a number of bits in the third bitmap is a total number of subcarriers comprised in a physical resource block within the reference range, and each bit in the third bitmap indicates a subcarrier which indicates whether the rate matching is performed on the subcarrier or not.

8. An apparatus for configuring uplink time-frequency resource sets, comprising:
a memory; and
a processor,
wherein a computer program that can be executed on the processor is stored in the memory, and when the computer program is executed by the processor, the computer program causes the processor to:
configure at least one of the uplink time-frequency resource sets for a User Equipment (UE) configured with an uplink transmission multiplexing mode, wherein the uplink time-frequency resource sets comprise time-frequency resource units on which the UE performs rate matching;
transmit one or more indication groups to the UE to indicate the at least one of the uplink time-frequency resource sets;
configure one or more reference ranges for the uplink time-frequency resource sets; and
configure a corresponding relationship between the one or more reference ranges and the one or more indication groups, wherein each of the uplink time-frequency resource sets corresponds to a reference range of the one or more reference ranges, so that the UE receives the one or more indication groups, determines a corresponding reference range of the one or more reference ranges according to the corresponding relationship, and determines each of the uplink time-frequency resource sets within the determined corresponding reference range based on the one or more indication groups,
wherein one of the uplink time-frequency resource sets is indicated by at least one of the indication groups and each of the indication groups comprise a symbol level indication, a resource block level indication and a subcarrier level indication, wherein the symbol level indication, the resource block level indication and the subcarrier level indication in combination are used by the UE to determine at least one resource on which the UE performs rate matching; and wherein the uplink transmission multiplexing mode means that the UE can multiplex a time-frequency resource with one or more other UEs for uplink transmission,
wherein the resource block level indication is indicated by a second bitmap, a number of bits in the second bitmap is a total number of physical resource blocks comprised in the reference range, and each bit in the second bitmap indicates a physical resource block which indicates whether the rate matching is performed on the physical resource block or not,
wherein the subcarrier level indication is indicated by a third bitmap which belongs to a data type of a string, a number of bits in the third bitmap is a total number of subcarriers comprised in a physical resource block within the reference range, and each bit in the third bitmap indicates a subcarrier which indicates whether the rate matching is performed on the subcarrier or not.

9. The apparatus according to claim 8, wherein the symbol level indication is indicated by a first bitmap, a number of bits in the first bitmap is a total number of symbols comprised in the reference range, and each bit in the first bitmap indicates a symbol which indicates whether the rate matching is performed on the symbol or not.

10. The apparatus according to claim 9, wherein each indication group uses a length of the first bitmap as a unit for periodic application in a time domain.

11. The apparatus according to claim 8, wherein the subcarrier level indication is performed by indicating a configuration type of a demodulation reference signal, a number of a transmission port of the demodulation reference signal, and a subcarrier interval corresponding to the demodulation reference signal, so that the rate matching is performed on a subcarrier index corresponding to the transmission port of the demodulation reference signal, wherein the subcarrier index corresponding to the transmission port of the demodulation reference signal is a subcarrier index in a physical resource block within a subcarrier interval corresponding to the UE, and the subcarrier index is determined by calculation of the UE based on the configuration type, the number of the transmission port, and the subcarrier interval corresponding to the demodulation reference signal and the subcarrier interval of the UE.

12. The apparatus according to claim 8, wherein the reference range is configured for the UE by a base station through a Radio Resource Control (RRC) signaling or a default setting.

13. The apparatus according to claim 8, wherein the uplink time-frequency resource sets are configured for the UE by a base station through a Radio Resource Control (RRC) signaling.

* * * * *